(12) United States Patent
Thomas et al.

(10) Patent No.: US 6,538,497 B2
(45) Date of Patent: Mar. 25, 2003

(54) ON-CHIP POWER SUPPLY BOOST FOR VOLTAGE DROOP REDUCTION

(75) Inventors: Thomas P. Thomas, Hillsboro, OR (US); Ian A. Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/819,135

(22) Filed: Mar. 27, 2001

(65) Prior Publication Data

US 2002/0140494 A1 Oct. 3, 2002

(51) Int. Cl.[7] .............................. G05F 1/56; G05F 1/44
(52) U.S. Cl. ...................... 327/543; 327/541; 307/44; 323/313
(58) Field of Search ................................. 327/530, 538, 327/543, 540, 541; 307/44, 64, 86, 87; 323/312, 313

(56) References Cited

U.S. PATENT DOCUMENTS

| | | | | |
|---|---|---|---|---|
| 3,886,438 A | * | 5/1975 | Bouman | 323/275 |
| 4,463,270 A | * | 7/1984 | Gordon | 327/51 |
| 4,528,459 A | * | 7/1985 | Wiegel | 307/66 |
| 6,000,829 A | * | 12/1999 | Kurokawa et al. | 327/121 |
| 6,040,639 A | * | 3/2000 | Ginell et al. | 307/44 |
| 6,097,178 A | * | 8/2000 | Owen et al. | 323/273 |
| 6,157,178 A | * | 12/2000 | Montanari | 323/273 |

* cited by examiner

Primary Examiner—Timothy P. Callahan
Assistant Examiner—Terry L. Englund
(74) Attorney, Agent, or Firm—Blakely, Sokoloff, Taylor & Zafman LLP

(57) ABSTRACT

A method and apparatus for maintaining a stable power supply voltage. The method comprises using a power supply to provide power at a power supply voltage to a plurality of semiconductor devices. The power supply voltage is nominally at an optimal power supply voltage. A fast increase in the current can cause a drop in the supply voltage, since the high rate of change in current is through the package inductance. The power supply voltage is monitored. Further, a supplemental higher voltage power supply is used to boost the power supply voltage to substantially the optimal power supply voltage if the power supply voltage decreases by a threshold value.

10 Claims, 2 Drawing Sheets

ON-CHIP POWER SUPPLY BOOST FOR VOLTAGE DROOP REDUCTION

TECHNICAL FIELD OF THE INVENTION

The present invention relates to integrated circuits, and more particularly, to integrated circuits having a stable power supply voltage.

BACKGROUND OF THE INVENTION

Advances in integrated circuit technology have resulted in higher density of devices, faster operating speeds, higher currents, and lower operating voltages. It is necessary to reduce noise on the power supply for correct operation at maximum speed.

One prior art method of maintaining a steady power supply voltage is to use one or more "decoupling" capacitors. These decoupling capacitors serve as charge buffers, sinking current during a positive voltage spike and supplying current during a negative voltage spike. For example, a fast increase in the current drawn by the integrated circuit may cause a drop in the power supply voltage, since the high rate of change in current is through the package inductance. This is referred to as a power supply voltage droop. To reduce the droop, a decoupling capacitor is used.

The size of the decoupling capacitor required increases with an increased rate of change of power supply current and increased package inductance for a given voltage droop. However, increasing the size of the decoupling capacitors can become expensive, if it increases the chip area or requires additional processing steps to integrate a large value capacitor onto an integrated circuit.

FIG. 1 shows a schematic layout of an integrated circuit using a prior art decoupling capacitor. An integrated circuit 101 includes multiple devices that draw a current 103 from a power supply 106 at a voltage $V_{dd}$. When there is a fast increase in the current 103 drawn by the devices on the integrated circuit 101, there will be a voltage droop in the power supply 106. The high rate of current change is through a package inductance 107, which in FIG. 1 is shown to be coupled to a package resistance $R_{pkg}$. To reduce the amount of the voltage droop, a significant part of the current can be supplied by an on-chip decoupling capacitor 109, which is shown as being coupled to a resistance, $R_{die}$.

However, as noted above, the formation of the on-chip decoupling capacitor may be expensive in terms of chip area and processing steps.

BRIEF DESCRIPTION OF THE DRAWINGS

The present invention detailed illustrated by way of example and not limitation in the accompanying Figures.

DETAILED DESCRIPTION

Methods and apparatus for compensating for power supply voltage droop are disclosed. The subject of the invention will be described with reference to numerous details set forth below, and the accompanying drawings will illustrate the invention. The following description of the drawings are illustrative of the invention and are not to be construed as limiting the invention. Numerous specific details are described to derive a thorough understanding of present invention. However, in certain circumstances, well known, or conventional details are not described in order not to obscure the present invention in detail.

Integrated circuits have a multitude of semiconductor devices. Semiconductor devices are defined to be any device that is formed in a semiconductor substrate. Many of these devices require a power supply in order to operate. The power supply, typically referred to as $V_{dd}$, is distributed throughout the integrated circuit. In modern integrated circuits, the power supply has a voltage of only a few volts or less. It is important to maintain the power supply voltage at a steady level, not withstanding various current draw conditions.

Figure 1:
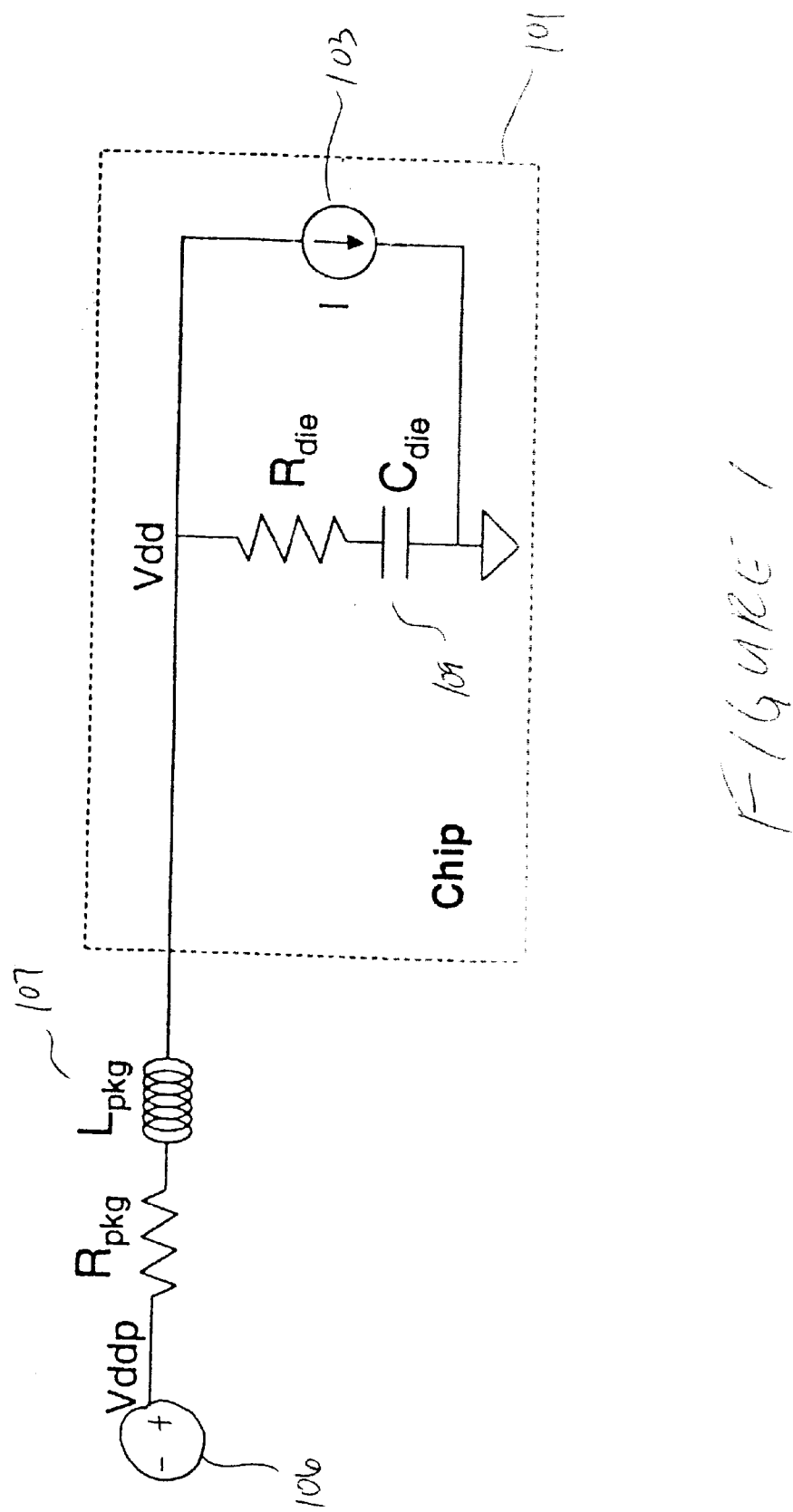
FIG. 1 is a schematic illustration of a prior art integrated circuit using an on-chip decoupling capacitor.
Figure 2:
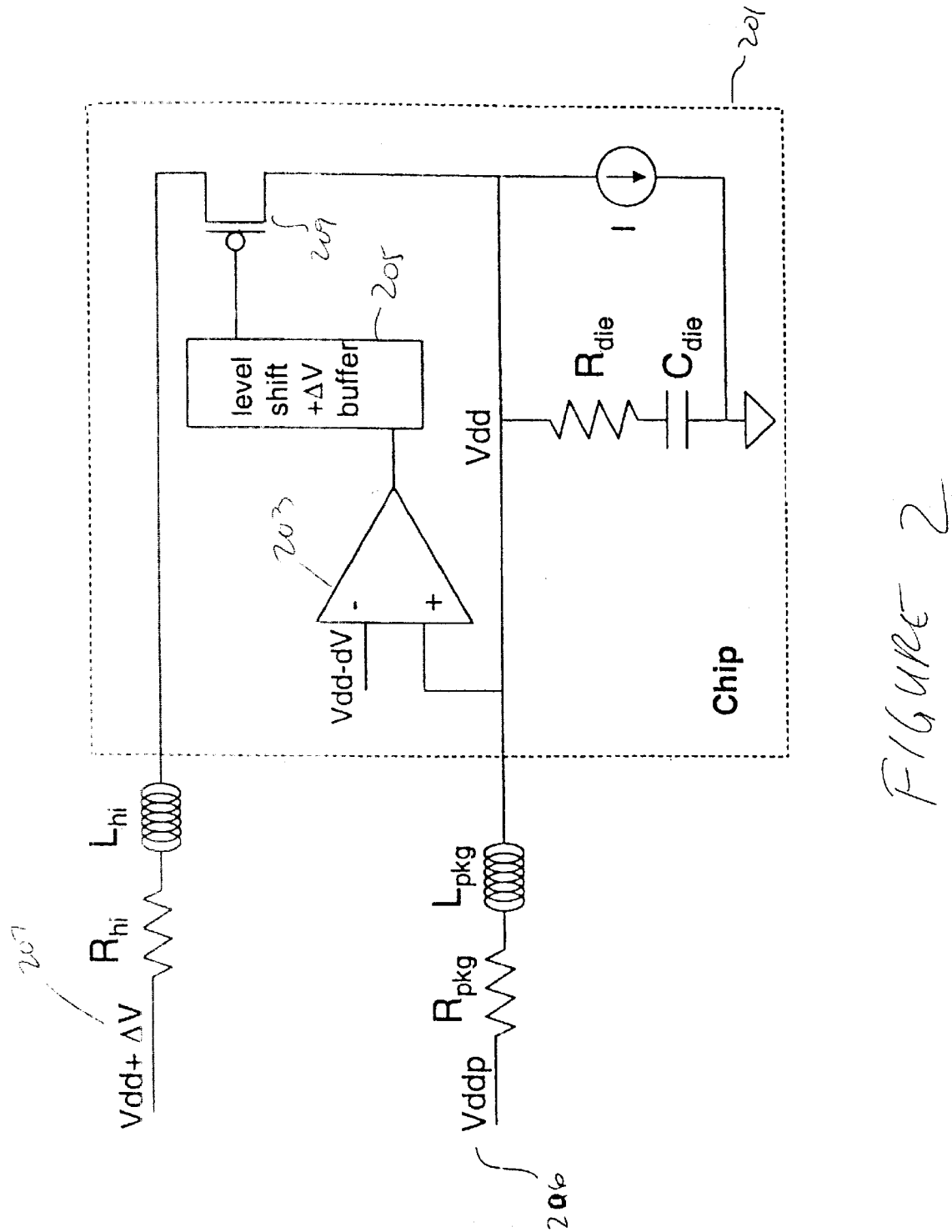
FIG. 2 is a schematic diagram of an integrated circuit incorporating the apparatus of the present invention.

FIG. 2 shows an integrated circuit 201 that has incorporated an apparatus in accordance with the present invention. In many respects, the integrated circuit of FIG. 2 is similar to the integrated circuit of FIG. 1 except for the addition of an on-chip power supply boost circuitry. The boost circuitry includes a comparator 203, a level shift buffer 205, a supplemental power supply 207, and a switching transistor 209. As shown in FIG. 2, the supplemental power supply 207 is connected to the switching transistor 209 and coupled to a resistance $R_{hi}$ and an inductance $L_{hi}$. The integrated circuit 201 also includes in this embodiment a decoupling capacitor which is also shown in FIG. 2 as being coupled to a resistance $R_{die}$.

The supplemental power supply 207 supplies a voltage that is higher than the optimal power supply voltage $V_{ddp}$ by a predetermined amount, $\Delta V$. Typically, the value of $\Delta V$ may be determined based upon the particular integrated circuit and package, but is typically on the order of a few 100 millivolts. The comparator 203 has its non-inverting input terminal coupled to the on-chip power supply $V_{dd}$ 206 of the integrated circuit 201. The power supply 206 nominally supplies a power supply voltage $V_{ddp}$. In FIG. 2, the power supply 206 is shown as being coupled to package resistance $R_{pkg}$. The inverting input terminal is set to be at a voltage below that of the optimal power supply voltage. Thus, as seen in FIG. 2, the inverting input is tied to $V_{dd}$–dV. The supplemental power supply is typically generated on-chip, but may also be brought into the chip. The value of dV may be determined based upon the particular integrated circuit, but is typically relatively small, on the order of 50 millivolts. The comparator 203 operates to determine whether or not the voltage on the power supply line is drooping excessively. Thus, if the voltage of the chip power supply $V_{dd}$ begins to droop below $V_{dd}$–dV, then the comparator 203 outputs a control signal to the level shift buffer 205.

The level shift buffer 205 adds to the control signal the difference (V) between the voltage of the supplemental power supply 207 and the power supply voltage. Thus, the output of the level shift buffer 205 is the control signal plus V. The level shift buffer 205 is used when the switching transistor 209 cannot tolerate a high voltage.

The switching transistor 209 should be sufficiently large to have a relatively low on resistance and voltage drop, but optimized to reduce area penalty, which would affect the decoupling capacitor. The gating transistor 209 is a transistor that is switched off when the on-chip power supply $V_{dd}$ 206 voltage returns above the predetermined reference voltage $V_{dd}$–dV. As noted above, the level shift buffer 205 is used to protect the switching transistor 209 from voltages higher than $V_{dd}$. However, if the switching transistor 209 is a high voltage transistor, then the level shift buffer 205 can be removed and the output of the comparator 203 can be directly used to drive the gating transistor 209.

To prevent the supplemental voltage supply 207 from increasing the inductance of the integrated circuit package, the supplemental voltage supply 207 is routed non-optimized, producing a high inductance. Because the inductance of the supplemental voltage supply 207 is larger than that of the power supply 206, the power supply voltage $V_{ddp}$ should be sufficiently higher than the power supply to reduce voltage droop.

Thus, when a voltage droop is sensed in the power supply, typically caused by a rapid increase in the current drawn by the integrated circuit 201, the boost circuitry (the comparator 203, level shift buffer 205, and gating transistor 209) is activated. Since a part of the current is now supplied by the boost circuitry, the voltage droop in the power supply can be reduced without increasing the size of the decoupling capacitor, for a given package and rate of current increase.

While specific embodiments of applications of the present invention have been illustrated and described, it is to be understood that the invention is not limited to the precise configuration and components disclosed herein. Various modifications, changes, and variations, which will be apparent to those skilled in the art, may be made in the arrangement, operation, in details of the methods and systems of the present invention disclosed herein without departing from the spirit and scope of the invention.

These modifications can be made to the invention in light of the above detailed description. The terms used in the following claims should not be used to limit the invention to the specific embodiments disclosed in the specification and the claims. Rather, the scope of the invention is to be determined entirely by the following claims, which are to be construed in accordance with established canons of claim interpretation.

What is claimed is:

1. An integrated circuit comprising:
    a plurality of semiconductor devices;
    a power supply coupled to provide current at a power supply voltage to said plurality of semiconductor devices, said power supply voltage nominally at an optimal power supply voltage;
    a supplemental power supply;
    a comparator coupled to monitor said power supply voltage and to supply a control signal if said power supply voltage decreases by a threshold value;
    a switch coupled to receive said control signal and to allow said supplemental power supply to boost said power supply voltage to substantially said optimal power supply voltage; and
    a level shift buffer coupled to receive said control signal and shift a voltage of said control signal to a level compatible with said switch, the level shift buffer further coupled to shift the voltage of said control signal upward by a difference between said power supply voltage and a voltage of said supplemental power supply.

2. The integrated circuit of claim 1 further including a decoupling capacitor coupled to said switch.

3. The integrated circuit of claim 1 wherein said switch is a transistor.

4. The integrated circuit of claim 1 wherein said threshold value is about 50 millivolts.

5. A method comprising:
    using a power supply to provide power at a power supply voltage to a plurality of semiconductor devices, said power supply voltage nominally at an optimal power supply voltage;
    monitoring said power supply voltage using a comparator, said comparator outputting a control signal if said power supply voltage is below said optimal power supply voltage by more than a threshold voltage;
    using a supplemental power supply to boost said power supply voltage when said control signal is present to substantially said optimal power supply voltage; and
    shifting upward a level of said control signal by a difference between a voltage of said supplemental power supply and said optimal power supply voltage.

6. The method of claim 5 further including using a decoupling capacitor to boost said power supply voltage.

7. The method of claim 5 wherein said threshold voltage is about 50 millivolts.

8. A power supply system for an integrated circuit comprising:
    a primary power supply to supply power to said integrated circuit at a power supply voltage that is nominally at an optimal power supply voltage;
    a supplemental power supply coupled to the primary power supply;
    a comparator coupled to compare said power supply voltage from said primary power supply to a threshold voltage, and if said power supply voltage is below said threshold voltage, to cause said supplemental power supply to augment said primary power supply; and
    a level shift buffer coupled to receive a control signal from the comparator and shift a voltage of said control signal to a level compatible with a switch coupled to receive said control signal, the level shift buffer further coupled to shift the voltage of said control signal upward by a difference between said power supply voltage and a voltage of said supplemental power supply.

9. The system of claim 8 further including a decoupling capacitor coupled to the primary power supply.

10. The system of claim 8 wherein said threshold voltage is about 50 millivolts below said optimal power supply voltage.

* * * * *